United States Patent
Chanclon Fernandez et al.

(10) Patent No.: US 10,919,225 B2
(45) Date of Patent: Feb. 16, 2021

(54) INLET FOR BUILD MATERIAL CONTAINER

(71) Applicant: HEWLETT-PACKARD DEVELOPMENT COMPANY, L.P., Houston, TX (US)

(72) Inventors: Ismael Chanclon Fernandez, Sant Cugat del Valles (ES); Jaime Cabanes, Sant Cugat del Valles (ES); Ernesto Alejandro Jones Poppescou, Sant Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/088,620

(22) PCT Filed: Oct. 27, 2016

(86) PCT No.: PCT/US2016/059164
§ 371 (c)(1),
(2) Date: Sep. 26, 2018

(87) PCT Pub. No.: WO2018/080505
PCT Pub. Date: May 3, 2018

(65) Prior Publication Data
US 2019/0105835 A1  Apr. 11, 2019

(51) Int. Cl.
*B29C 64/255* (2017.01)
*B33Y 30/00* (2015.01)
*B29C 64/153* (2017.01)

(52) U.S. Cl.
CPC ............ *B29C 64/255* (2017.08); *B33Y 30/00* (2014.12); *B29C 64/153* (2017.08)

(58) Field of Classification Search
CPC ...... B29C 64/255; B29C 64/153; B33Y 30/00
USPC ................. 454/237, 50, 184, 174, 271, 368
See application file for complete search history.

(56) References Cited

U.S. PATENT DOCUMENTS

| | | | | |
|---|---|---|---|---|
| 2,704,504 A | * | 3/1955 | Wilkening | F24F 13/24 454/195 |
| 4,351,230 A | * | 9/1982 | Brickner | B65D 88/741 34/235 |
| 4,625,627 A | * | 12/1986 | Livanos | F17C 13/084 454/237 |
| 6,105,875 A | * | 8/2000 | Lagrotta | H05K 7/20572 165/80.3 |
| 6,164,369 A | * | 12/2000 | Stoller | H05K 7/20572 165/104.33 |

(Continued)

FOREIGN PATENT DOCUMENTS

| | | |
|---|---|---|
| CN | 206682494 U | 10/2015 |
| JP | 2002370374 | 12/2002 |

(Continued)

*Primary Examiner* — Edelmira Bosques
*Assistant Examiner* — Dana K Tighe
(74) *Attorney, Agent, or Firm* — Trop Pruner & Hu PC

(57) ABSTRACT

Examples of an inlet to enable a forced air flow to enter a build material container in a 3D additive manufacturing system are described. In one case, the inlet has a structure having an inner face and an outer face forming at least one aperture through the structure through which forced air flows in use. The inlet has a longitudinal axis and the inner face and outer face are non-aligned along at least one axis which passes through each of inner face and the outer face and is substantially parallel to the longitudinal axis.

21 Claims, 9 Drawing Sheets

(56) References Cited

U.S. PATENT DOCUMENTS

| | | | |
|---|---|---|---|
| 6,471,750 B1* | 10/2002 | Olander | B01D 53/0446 222/3 |
| 6,889,752 B2* | 5/2005 | Stoller | H05K 7/206 165/122 |
| 8,185,229 B2 | 5/2012 | Davidson | |
| 8,973,759 B2 | 3/2015 | Ichikawa et al. | |
| 2001/0045678 A1 | 11/2001 | Kubo | |
| 2004/0012112 A1 | 1/2004 | Davidson et al. | |
| 2004/0084814 A1 | 5/2004 | Boyd et al. | |
| 2004/0090501 A1 | 5/2004 | Yoshida et al. | |
| 2008/0241404 A1 | 10/2008 | Allaman et al. | |
| 2015/0298397 A1 | 10/2015 | Chen et al. | |

FOREIGN PATENT DOCUMENTS

| | | |
|---|---|---|
| JP | 2009508793 | 3/2009 |
| KR | 2014-0017125 | 2/2014 |
| WO | 2015199697 A1 | 12/2015 |
| WO | 2016144295 A1 | 9/2016 |

\* cited by examiner

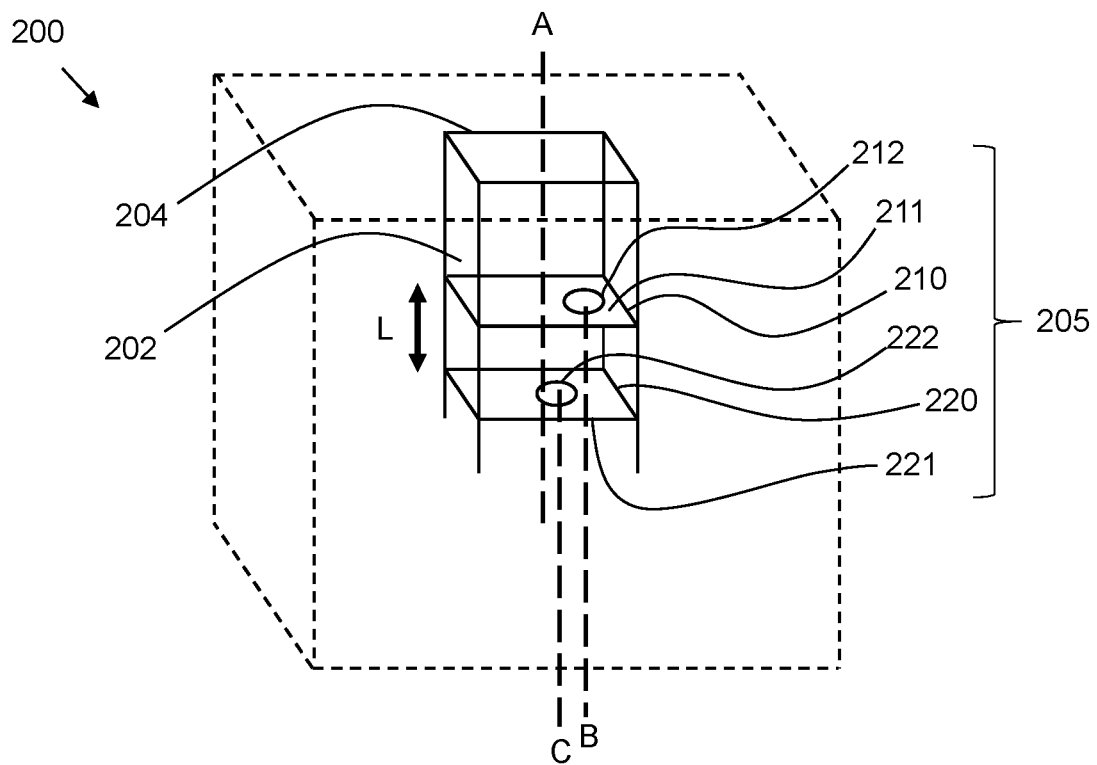
*Fig. 2A*
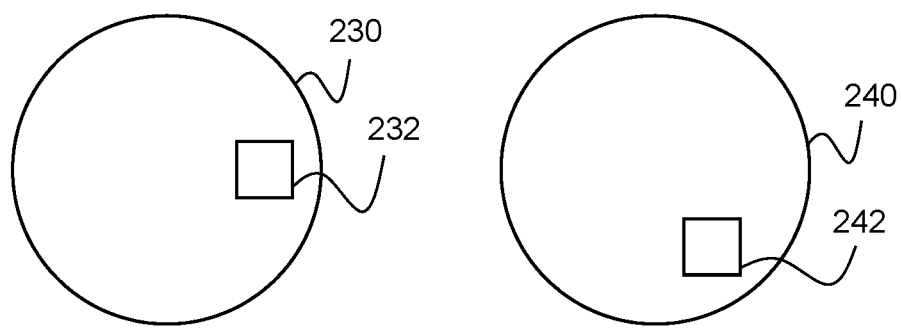
*Fig. 2B*  *Fig. 2C*

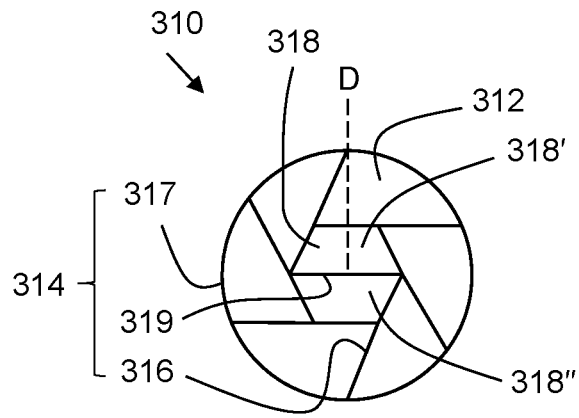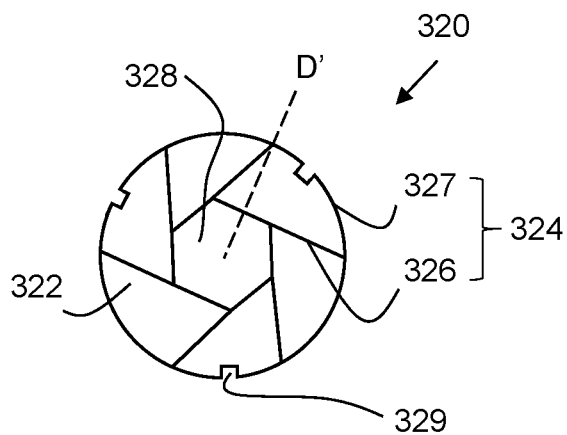
*Fig. 3A*     *Fig. 3B*
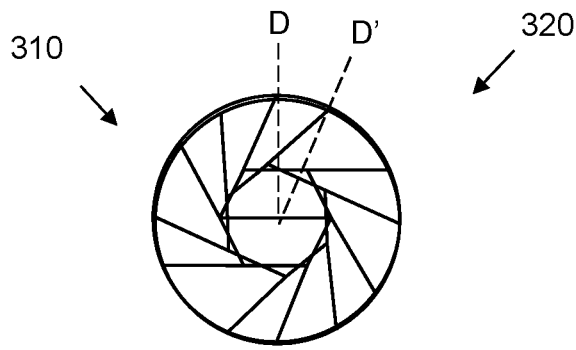
*Fig. 3C*
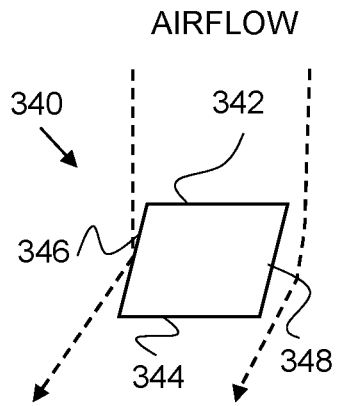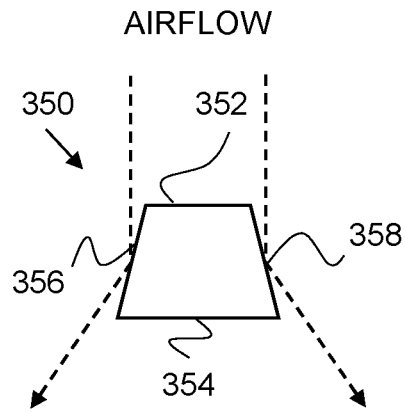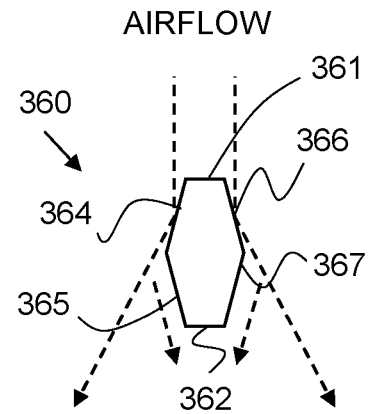
*Fig. 3D*     *Fig. 3E*     *Fig. 3F*

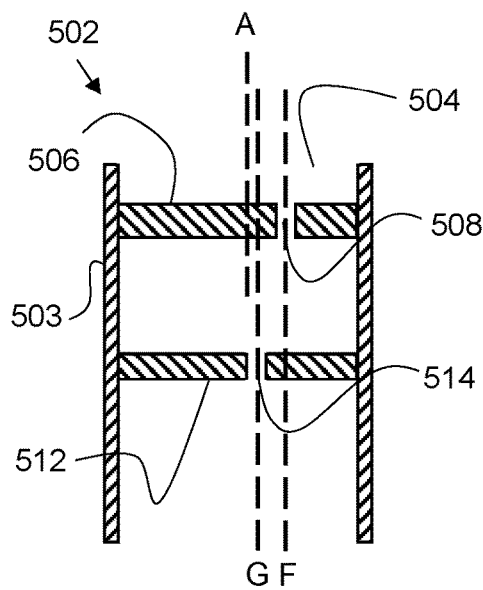
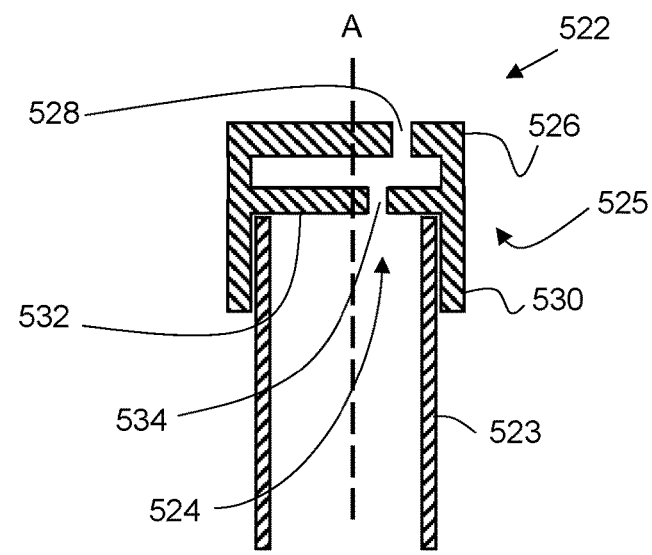
Fig. 5A          Fig. 5B
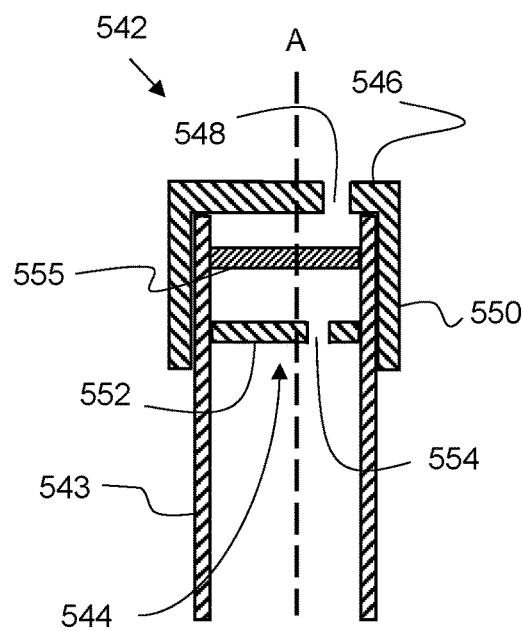
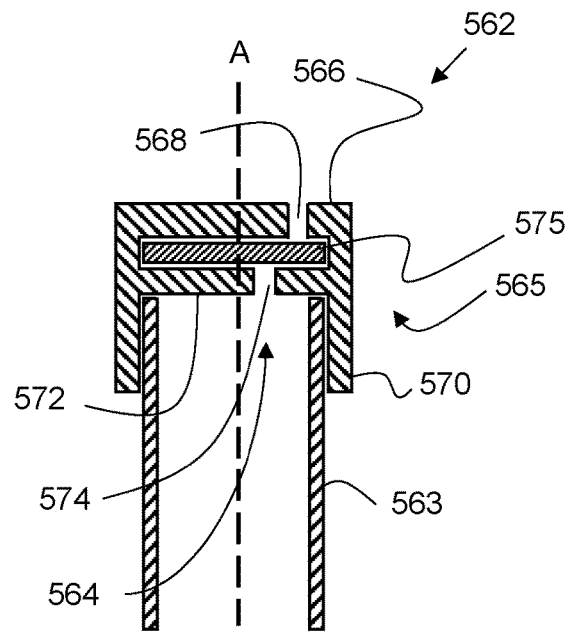
Fig. 5C          Fig. 5D

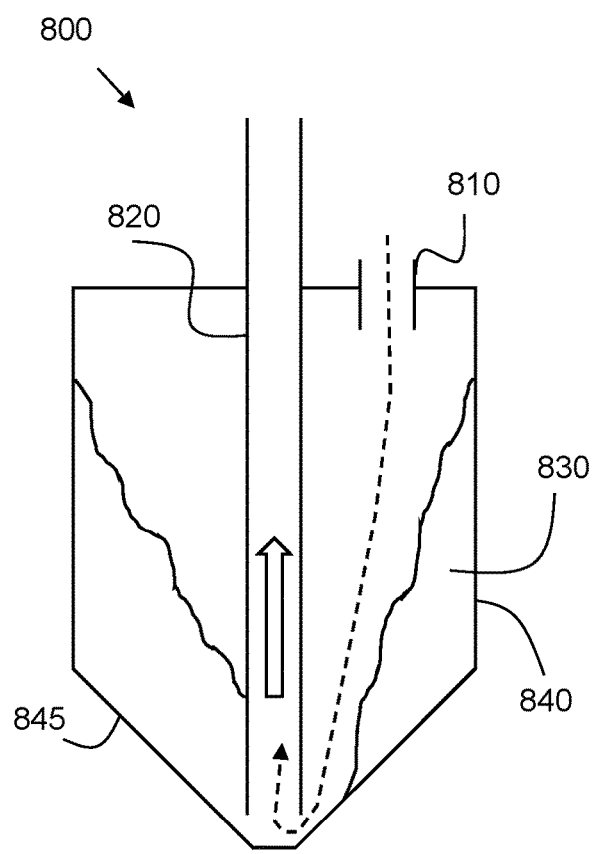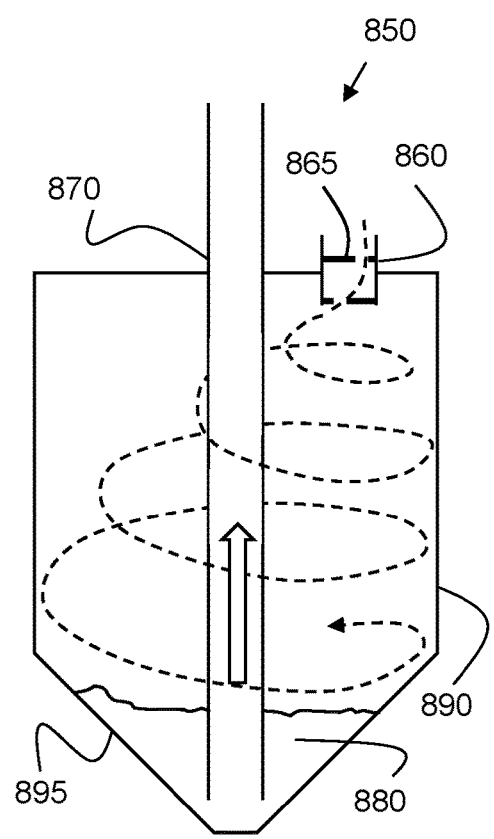
*Fig. 8A*  *Fig. 8B*

INLET FOR BUILD MATERIAL CONTAINER

BACKGROUND

Additive manufacturing techniques such as three-dimensional (3D) printing, relate to techniques for making 3D objects of almost any shape from a digital 3D model through additive processes, in which 3D objects are generated on a layer-by-layer basis under computer control. A large variety of additive manufacturing technologies have been developed, differing in build materials, deposition techniques and processes by which the 3D object is formed from the build material. Such techniques may range from applying ultraviolet light to photopolymer resin, to melting semi-crystalline thermoplastic materials in powder form, to electron-beam melting of metal powders.

Additive manufacturing processes usually begin with a digital representation of a 3D object to be manufactured. This digital representation is virtually sliced into layers by computer software or may be provided in pre-sliced format. Each layer represents a cross-section of the desired object, and is sent to an additive manufacturing apparatus, that in some instances is known as a 3D printer, where it is built upon a previously built layer. This process is repeated until the object is completed, thereby building the object layer-by-layer. While some available technologies directly print material, others use a recoating process to form additional layers that can then be selectively solidified in order to create the new cross-section of the object.

The build material from which the object is manufactured may vary depending on the manufacturing technique and may comprise powder, or powder-like, material, paste material, slurry material or liquid material. The build material is usually provided in a source container, referred to herein as a build material container, from where it is to be transferred to the building area or building compartment of the additive manufacturing apparatus where the actual manufacturing takes place.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein:

FIG. 2A is a schematic diagram of components of an inlet of a build material container according to an example;

FIG. 2B is a schematic diagram of a component of an inlet of a build container according to an example;

FIG. 2C is a schematic diagram of a component of an inlet of a build container according to an example;

FIG. 3A is a schematic diagram of a component of an inlet of a build container according to an example;

FIG. 3B is a schematic diagram of a component of an inlet of a build container according to an example;

FIG. 3C is a schematic diagram of components of an inlet of a build container according to an example;

FIG. 3D is a schematic cross-sectional diagram of a component of an inlet of a build container according to an example;

FIG. 3E is a schematic cross-sectional diagram of a component of an inlet of a build container according to an example;

FIG. 3F is a schematic cross-sectional diagram of a component of an inlet of a build container according to an example;

FIG. 5A is a schematic diagram of components of an inlet of a build material container according to an example;

FIG. 5B is a schematic diagram of components of an inlet of a build material container according to an example;

FIG. 5C is a schematic diagram of components of an inlet of a build material container according to an example;

FIG. 5D is a schematic diagram of components of an inlet of a build material container according to an example;

FIG. 8A is a schematic diagram of a component of a 3D printing system according to an example; and, FIG. 8B is a schematic diagram of a component of a 3D printing system according to an example.

DETAILED DESCRIPTION

Figure 1A:
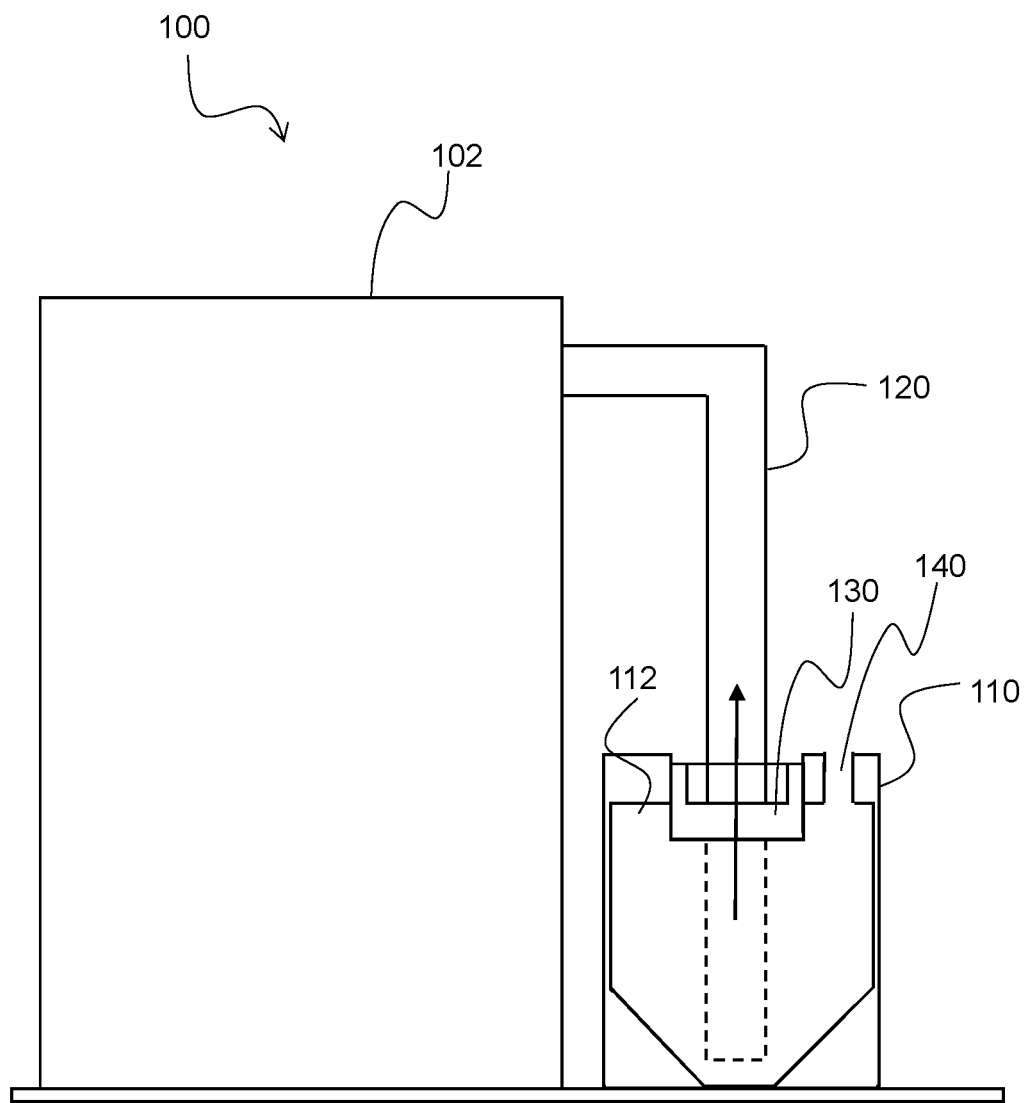
FIG. 1A is a schematic diagram of a 3D printing system according to an example.

Three-dimensional (3D) objects can be generated using additive manufacturing techniques. The objects may be generated by solidifying portions of successive layers of build material. The build material can be powder-based and the properties of generated objects may be dependent upon the type of build material and the type of solidification. In some examples, solidification of the powder material is enabled using a liquid fusing agent. In further examples, solidification may be enabled by temporary application of energy to the build material. In certain examples, fuse and/or bind agents are applied to build material, wherein a fusing agent is a material that, when a suitable amount of energy is applied to a combination of build material and fusing agent, causes the build material to fuse and solidify. In other examples, other build materials and other methods of solidification may be used. In certain examples, the build material includes paste material, slurry material or liquid material. This disclosure describes examples of inlet structures for build material containers which contain and deliver build material to the additive manufacturing process.

In one example the build material used in the additive manufacturing process of this disclosure is a powder. The powder may have an average volume-based cross sectional particle diameter size of between approximately 5 and approximately 400 microns, between approximately 10 and approximately 200 microns, between approximately 15 and approximately 120 microns or between approximately 20 and approximately 70 microns. Other examples of suitable, average volume-based particle diameter ranges include approximately 5 to approximately 70 microns, or approximately 5 to approximately 35 microns. In this disclosure a volume-based particle size is the size of a sphere that has the same volume as the powder particle. With "average" it is intended to explain that most of the volume-based particle sizes in the container are of the mentioned size or size range but that the container may also contain particles of diameters outside of the mentioned range. For example, the particle sizes may be chosen to facilitate distributing build material layers having thicknesses of between approximately 10 and approximately 500 microns, or between approximately 10 and approximately 200 microns, or between approximately 15 and approximately 150 microns. One example of an additive manufacturing system may be pre-set to distribute build material layers of approximately 80 microns using build material containers that contain powder having average volume-based particle diameters of between approximately 40 and approximately 60 microns. For example, the additive manufacturing apparatus can be reset to distribute different layer thicknesses. In an example the build material used in the additive manufacturing process of the disclosure may comprise non-round, for example generally elongate, particles. In an example, the build material may comprise a short fiber powder.

Suitable powder-based build materials for use in example containers of this disclosure include at least one of polymers, crystalline plastics, semi-crystalline plastics, polyethylene (PE), polylactic acid (PLA), acrylonitrile butadiene styrene (ABS), amorphous plastics, Polyvinyl Alcohol Plastic (PVA), Polyamide, thermo(setting) plastics, resins, transparent powders, colored powders, metal powder, ceramics powder such as for example, glass particles, and/or a combination of at least two of these or other materials, wherein such combination may include different particles each of different materials, or different materials in a single compound particle. Examples of blended build materials include alum ide, which may include a blend of aluminum and polyamide, multi-color powder, and plastics/ceramics blends. Blended build material may comprise two or more different respective average particle sizes.

An example of a 3D printing system 100 is shown schematically in FIG. 1A. The 3D printing system 100 comprises a 3D printer 102, a build material container 110 (hereinafter termed a "container") comprising an internal reservoir 112 for holding build material, for example a powder-based build material, and a build material transport system 120 for transporting build material between the container 110 and the 3D printer 102. The 3D printing system 100 may be an additive manufacturing system for generating 3D objects using build material stored in the container 110. The 3D printer 102 may comprise a 3D printing part and a separate build material management part. Alternatively, the 3D printer 102 may comprise a 3D printing function and a build material management function incorporated within a single apparatus. The transport system 120 may comprise an aspiration system (not shown), which generates a suction pressure to extract build material from the container 110 for delivery to the 3D printer 102 by pneumatic transport. Connection between the transport system 120 and the container 110 is facilitated by a build material outlet structure 130, which provides an aspiration channel through which build material stored in the container 300 may be extracted or "aspirated" via the transport system 120 to the 3D printer 102. According to some examples, the transport system 120 is provided with a nozzle structure (not shown) to connect to the outlet structure 130 of the container 110 in a sealable manner, thereby facilitating pneumatic transport of the build material from the container 110 to the 3D printer 102. According to some examples, the container 110 includes an inlet 140 through which air can pass in to the container 110 to normalize the air-pressure therein as build material is aspirated from the outlet structure 130. The air that passes into the container 110 is a forced airflow by virtue of the manner in which the build material is aspirated from the container.

Figure 1B:
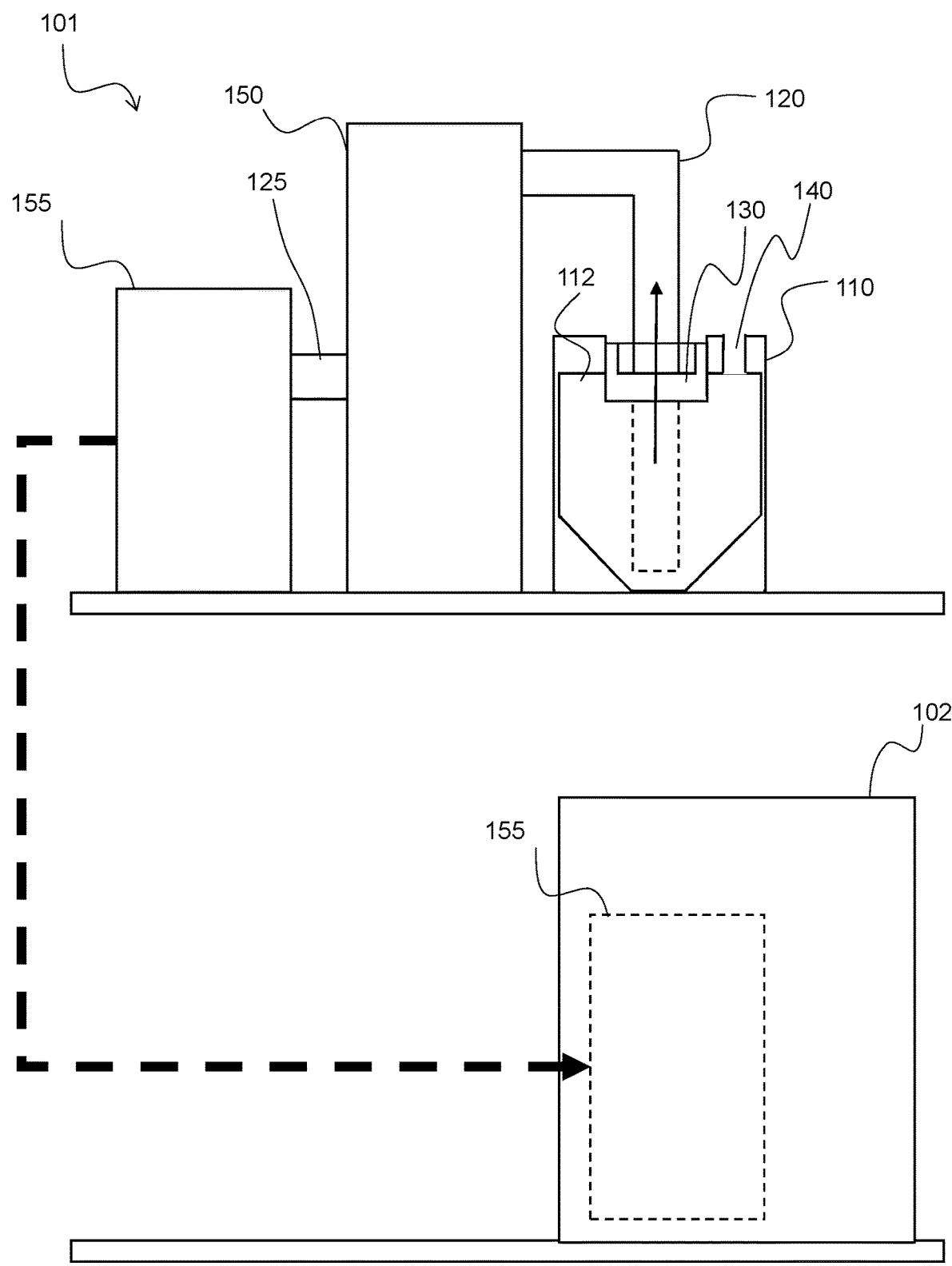
FIG. 1B is a schematic diagram of a 3D printing system according to an example.

Another example of a 3D printing system 101 is shown schematically in FIG. 1B. Features in FIG. 1B that are similar to features in FIG. 1A have been labelled with the same numerals and description for these is not repeated. In the example shown, the container 110 is connected to a powder management station (PMS) 150 via a build material transport system 120. In certain examples, the PMS 150 extracts and stores powder from the container 110 and, periodically, is used to fill a build unit(s) 155 with powder via a second build material transport system 125. The build unit 155 resides in a 3D printer 102 in use and when build material has been depleted may be disconnected from the 3D printer 102 and transported to the PMS 155 for refilling. The build unit 155 is then returned and reintroduced into the 3D printer 102 prior to a next build.

According to some examples, the inlet of a container comprises a structure (not illustrated in FIG. 1A) which disrupts a forced airflow as it enters into the container. According to some examples, the airflow that is created by a structure in the inlet is a turbulent airflow. According to some examples, the airflow that is created by a structure in the inlet is a rotational and/or cyclonic airflow.

By providing a disrupted and/or turbulent air flow, powder in the build container is more likely to be dislodged from regions within the container, such as inner walls, corners, joins and/or creases within the container, which would not otherwise be reached, by a relatively fast-flowing, disrupted, turbulent and/or chaotic air stream, thereby maximizing the amount of build material that can be extracted from the container, for example, without needing human intervention. Turbulent, disrupted or chaotic air streams may form a vortex in a container due to the air flowing around the container.

According to some examples a container comprises an inlet having a structure for disrupting airflow passing into the container, for example, to enable efficient removal of build material or build powder from a container. According to some examples there is provided a method for the efficient removal of powder from inner surfaces of a build material container.

According to some examples, a container may have an inlet having a longitudinal axis though an outer surface of the container. In certain examples, the inlet may comprise a structure which has an inner face and an outer face. The inner face and outer face may form at least one aperture through the structure through which forced air flows in use. In certain examples, the inner face and outer face may be non-aligned along at least one axis which passes through each of the inner face and the outer face and is substantially parallel to the longitudinal axis of the inlet.

In certain examples, a longitudinal axis of the inlet may be substantially perpendicular to the outer surface of the container. In certain examples, each of the inner face and the outer face may be substantially perpendicular to a longitudinal axis of the inlet. In certain examples, the outer surface may comprise a plane through which a longitudinal axis of the inlet projects and each of the inner face and the outer face may be substantially parallel to the plane of the outer surface.

FIG. 2A depicts a build container 200 according to an example. The container 200 has an inlet 202 having an open end 204 and a longitudinal axis A. The inlet 202 has an inlet structure 205. In this example, the structure 205 has a first element 210 and a second element 220. The first element 210 comprises an outer face 211 and the second element 220 comprises an inner face 221. The first element 210 and the second element 220 enable a forced air flow to enter into the container 200 in use. The first and second elements may be formed from plastics or other suitable materials.

The first element 210, according to the example shown in FIG. 2A, has a first aperture 212 and the second element 220 has a second aperture 222. In certain examples, the first aperture 212 is longitudinally offset from the second aperture 222 along an axis B that is substantially parallel to longitudinal axis A of the inlet 202. In certain examples, an axis B that projects through the centre of the first aperture 212 is parallel to, but offset from, an axis C that projects through the centre of the second aperture 222. An arrangement of apertures 212, 222 as illustrated in FIG. 2A disrupts a forced airflow passing through the inlet 202.

As shown in the particular example of FIG. 2A, the first and second apertures 212, 222, are substantially rounded apertures. As shown in the particular examples of FIGS. 2B and 2C, a first element 230 and a second element 240 have apertures 232, 242, which are not rounded. In certain other examples, the apertures 232, 242 of the first and second elements 230, 240 may be polygonal, or any other convenient shape(s).

FIGS. 3A and 3B show examples of elements for use in forming an inlet structure in an inlet of a container. FIG. 3A shows a first element 310 which has a first frame 314. The first frame 314 comprises a plurality of apertures 312 in a first arrangement. FIG. 3B shows a second element 320 which has a second frame 324. The second frame 324 comprises a plurality of apertures 322 in a second arrangement. As shown, the first arrangement of apertures 312 is substantially the same as the second arrangement of apertures 322.

As shown in the example of FIG. 3A, the frame 314 has six interconnected elongate arms 316 within a generally circular periphery 317. The arms 316 form a hexagonal aperture 318 in the centre of the element 310. One end of each arm 316 forming the hexagonal aperture 318 extends beyond the hexagonal aperture 318 to join the periphery 317, thereby connecting the hexagonal aperture 318 to the periphery 317 and forming six similar, part segments around the hexagonal aperture 318. The frame 314 also has a central projection 319, which projects across and bisects the hexagonal aperture 318. In this manner, the first central hexagonal aperture 318 may partitioned into two trapezoidal apertures 318', 318".

As shown in the example of FIG. 3B, the second element 320 has the same general grid-like appearance of the first element 310. In certain examples, the second element 320 has at least one alignment feature 329 in the periphery 327. In the example of FIG. 3B, the second element 320 has three alignment features 329. The alignment features 329 may be spaced apart substantially evenly around the periphery 327. In use, the alignment features 329 may engage with one or more complementary features of the inlet of the container to align the second element 320 in the inlet. The alignment features 329 may engage with one or more components of the inlet to align the second element 320 in a specific orientation within the inlet. In examples, the alignment features 329 are grooves or notches. In an example, alignment features 329 may engage with, for example, projections spaced around an inner circumferential groove (not shown) within an inlet tube, which supports the periphery 327 of the frame 324. Alternatively or additionally, the second element 320 may comprise projections to engage with grooves or notches in the inlet.

In certain examples, the first element 310 has alignment features which are similar to the alignment features 329 of the second element 320 (as described above), which co-operate with corresponding features within the inlet tube to align the first element 310 with respect to the second element 320. In certain examples, the first element 310 may have alignment features and the second element 320 may have no alignment features.

In certain examples, the first element 310 and second element 320 are profiled to assist in creating a disrupted air flow. In a specific example, the arms 316, 326 have substantially hexagonal longitudinal cross-sections. In an example, the arms 316, 326 have external surfaces comprising a plurality of substantially planar faces wherein at least one face is at an angle to another face to deflect an airflow to create a disrupted air flow. In certain examples, the arms 316 of the first element 310 have a different cross-section to the arms 326 of the second element 320. In certain examples, a first arm of the first element 310 or second element 320 may have a different cross-section to a second arm of the first element 310 or second element 320.

An example of a longitudinal cross-sectional view of an arm 340 is shown in FIG. 3D. The arm 340 has four substantially planar faces 342, 344, 346, 348. Two opposing planar faces 342, 344 are substantially parallel with respect to one another. The other two opposing planar faces 346, 348 are substantially parallel with respect to one another. In certain examples, the arm 340 has a substantially parallelogramical longitudinal cross-section, with upper and lower opposing faces being perpendicular to the direction of an incoming airflow. The incoming air flow is deflected by a first side face 346 of the arm 340. Incoming air flow flows around a second side face 348 of the arm 340. The arm of FIG. 3D changes the overall direction of the air flowing over it as shown. The air flow can therefore be guided in a direction desired by the user based on the relative angle between of the pairs of parallel faces.

An example of a longitudinal cross-sectional view of an arm 350 is shown in FIG. 3E. The arm 350 has four substantially planar faces 352, 354, 356, 358. Two of the planar faces 352, 354 are substantially parallel with respect to one another, with upper and lower opposing faces being perpendicular to the direction of an incoming airflow. The other two planar faces 356, 358 are not parallel with respect to one another. In certain examples, the arm 350 has a substantially trapezoidal longitudinal cross-section. Incoming air flow is deflected by a first side face 356. The air flow is deflected away from the arm 350. Incoming air flow is deflected by a second side face 358. The air flow is deflected away from the arm 350. The arm 350 of FIG. 3E creates a divergent air flow of the air flowing over the arm 350.

An example of a longitudinal cross-sectional view of an arm 360 is shown in FIG. 3F. The arm 360 has six substantially planar faces 361, 362, 364, 365, 366, 367. Two of the planar faces 361, 362 are substantially parallel with respect to one another, with upper and lower opposing faces being perpendicular to the direction of an incoming airflow. Another two planar faces 364, 367 are substantially parallel with respect to one another. The final two planar faces 365, 366 are substantially parallel with respect to one another. In certain examples, the arm 360 has a substantially hexagonal longitudinal cross-section. Incoming air flow is deflected by a first side face 364. The air flow is deflected away from the arm 360. Incoming air flow is deflected by a second side face 366. The air flow is deflected away from the arm 350. The arm 360 of FIG. 3F creates a divergent air flow of the air flowing over the arm 360. The arm 360 also creates a second convergent air flow due to the air flowing over the third side face 365 and fourth side face 367. The arm 360 of FIG. 3F therefore creates a disrupted air flow.

Inlet structures arranged as described herein, for example as in FIG. 3C, and comprising profiled elements or arms, for example as in FIGS. 3D-3F, act to disrupt a forced air flow into a build powder container. Such a disrupted air flow may be turbulent, cyclonic and may form a vortex.

Figure 4:
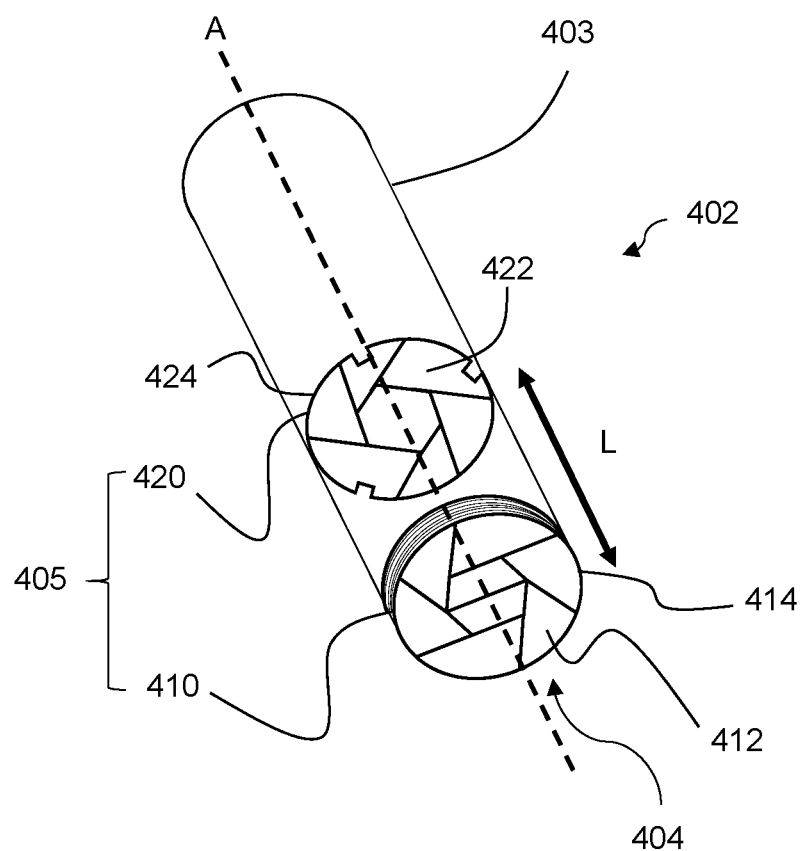
FIG. 4 is a schematic diagram of components of an inlet of a build material container according to an example.

In an example shown in FIG. 4, an inlet 402 comprises a generally round cross section tube 403 in which there is a structure 405 comprising a first element 410 and a second element 420. In certain examples, the first element 410 and the second element 420 are also spaced apart longitudinally in the inlet 402. As shown in FIG. 4, the first element 410 is spaced apart longitudinally by a distance L from the second element 420. In the example shown, the first element 410 is arranged towards the open end 404 of the inlet 402. As shown, the first element 410 and second element 420 are longitudinally aligned along the longitudinal axis A of the inlet 403. In certain examples, as shown in FIG. 4, the first frame 414 may be rotated about a longitudinal axis A of the inlet with respect to second frame 424 so that the apertures 412 of the first frame 414 are not aligned with apertures 422 of the second frame 424. In the example shown in FIG. 3A, for instance, the first element 310 has a first radial axis D which bisects one edge of the first central hexagonal aperture 318. In the example shown in FIG. 3B, the second element 320 has a second radial axis D' which bisects a corresponding edge of the second central hexagonal aperture 328. A clockwise rotation of the first element 310 about the longitudinal axis A of the inlet, causes a change in direction of the radial axis D, which is perpendicular to the longitudinal axis A of the inlet. The first element 310 or the second element 320 may be rotated relative to the other so that the apertures 312 of the first element 310 and the apertures 314 of the second element 320 do not align. In an example, the first element 310 is rotated by between about 10 degrees and 50 degrees. In an example, the first element 310 is rotated between about 30 degrees and 40 degrees. In the particular example of FIG. 3C, the second element 320 is rotated relative to the first element by about 20 degrees. In certain other examples (not shown), the first frame 414 and its respective apertures 412 may be aligned with the second frame 424 and its respective apertures 422.

In the example depicted in FIG. 4, the non-alignment of the apertures 412, 422 of the first and second element 410, 420 induces turbulence in a forced airflow that passes through the inlet 402 and into a respective container (not shown). In particular the structure 405 comprising the first and second elements 410, 420 induces a rotation in a forced airflow that passes through the inlet 402 and into a respective container (not shown).

FIGS. 5A to 5D show certain examples of arrangements of inlets to enable a disrupted forced air flow to enter into a container. The examples shown in FIGS. 5A to 5D of an inlet 502, 522, 542, 562 comprise a tubular arrangement having a generally round cross section tube 503, 523, 543, 563 and an open end 504, 524, 544, 564. In certain examples, an inlet 502, 522, 542, 562 has a first element 506, 526, 546, 566 with a first aperture 508, 528, 548, 568 and a second element 512, 532, 552, 572 with a second aperture 514, 534, 554, 574 arranged within the inlet 502, 522, 542, 562. In the specific examples of FIG. 5B and FIG. 5D, an inlet 522, 562 has a structure 525, 565 comprising a first element 526, 566 with a first aperture 528, 568 and a second element 532, 572 with a second aperture 534, 574 arranged within the inlet 502. In certain examples, an axis F that projects through the centre of the first aperture 508 is parallel to but offset from an axis G that projects through the centre of the second aperture 514. In certain examples, the first aperture 508, 528, 548, 568 is rotationally offset from the second aperture 514, 534, 554, 574. In certain examples, the first aperture 508, 528, 548, 568 is closer to a central point along the longitudinal axis A of the inlet 502, 522, 542, 562 than the second aperture 514, 534, 554, 574. In certain examples, the first aperture 508, 528, 548, 568 is further from a central point along the longitudinal axis A of the inlet 502, 522, 542, 562 than the second aperture 514, 534, 554, 574.

In contrast to the example shown in FIG. 5A, the example shown in FIG. 5B of an inlet 522 comprises an inlet tubular section 523 and an inlet structure 525, which fits onto the tubular section. The inlet structure 525 comprises a first element 526 with a first aperture 528 and a second element 532 with a second aperture 534. In the example of FIG. 5B, the structure 525 comprises a portion 530, which joins the first element 526 and the second element 532, and which attaches to the tubular section 523 to at least partially cover the open end 524 thereof. In certain examples, the structure 525 screws onto the tubular section 523 or is of a size to fit snuggly around the tubular section 523. The second element 532 may be fixedly attached to the structure 525 or be arranged to be removably attached thereto and rotationally aligned within the structure 525, with respect to an orientation of the first element 526, using a complementary arrangement of grooves, projections or similar as has been described above. The screw thread may be positioned on a portion 530 of the structure 525 that extends in a direction parallel to the longitudinal axis A of the inlet 522. The portion 530 of the structure 525 may cover at least some of the tubular section 523 of the inlet, as shown in FIG. 5B.

In the example shown in FIG. 5C, the inlet 542 comprises an open end 544 of a generally round cross section tubular section 543 and a first element 546 is arranged to releasably cover the open end 544 of the tubular section 543. In certain examples, the first element 546 screws onto the tubular section 543 or is of a size to fit snuggly around the tubular section 543. A portion 550 of the first element 546 may cover at least some of the tubular section 543, as shown in FIG. 5C.

In the example shown in FIG. 5C, a second element 552 is arranged within the tubular section 543 and spaced apart from the first element 546 along a longitudinal axis A of the inlet 542. In certain examples, an air filter 555 is supported between the first element 546 and the second element 552. The air filter 555 may for example comprise a plastics, metal, foam or fabric gauze or filter material, which may be suitably adapted to permit a forced air flow into the container but to prevent particles from entering or exiting the container. In the specific example shown, the air filter 555 filters air passing through the inlet when in use while also preventing build material from escaping from the container at other times. In certain examples, the air filter 555 is positioned between the first element 546 and the second element 552. In certain other examples, the air filter 555 may be positioned within at least one of the first aperture 548 and the second aperture 554. In certain other examples, the air filter 555 may be secured to the inlet 542 by one or more grooves or projections, as described previously with reference to the alignment features 329 of FIG. 3B. In some examples, the air filter 555 may be inserted or replaced by removing the first element from the tubular section 543.

In the example of FIG. 5D, a first element 566 and a second element 572 are part of a structure 565, similar to the structure 525 described earlier with reference to FIG. 5B. In the specific example of FIG. 5D, the structure 565 comprises a portion 570 which joins the first element 566 and the second element 572. In the example shown in FIG. 5D, a filter 575 is positioned between the first element 566 and the second element 572. In the example of FIG. 5D, the filter 575 may be inserted or replaced by removing the structure 565 from the tubular section 563 and separating the second element 572 from the portion 570. The second element 572 may then be replaced and aligned in the correct rotational orientation with respect to the orientation of the first element 566 by reference to complementary alignment features of the kind that have been described above. In certain other examples, the filter 575 may be accessible for example via a slot or drawer in structure 565. Alternatively or additionally, at least one of the first element 566 and the second element 572 may be removable from the structure 565 providing a user access to the filter 575. In certain examples, the structure 565 is modular and any of the first element 566, second element 572 and portion 570 may be disconnected and reconnected to the structure 505 to provide access to the filter 530.

The arrangements of apertures in the elements forming the structures in FIGS. 5A to 5D disrupt a forced airflow in to the respective containers. According to some examples, the elements and arrangements of elements and respective apertures of FIGS. 5A to 5D may comprise the form of elements that are depicted in FIGS. 3A and 3B, and be aligned as depicted in FIG. 3C.

Figure 6A:
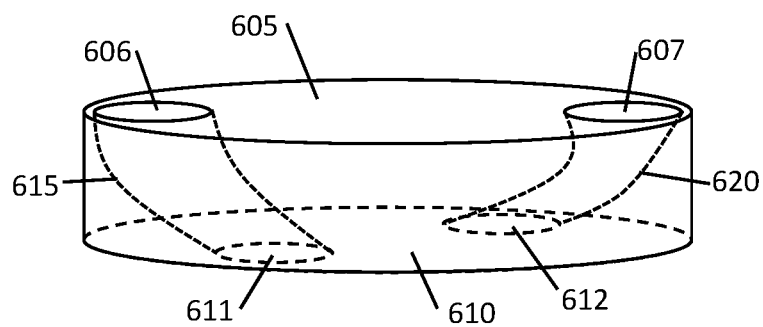
FIG. 6A is a schematic diagram of a view of a structure for an inlet according to an example.
Figure 6B:
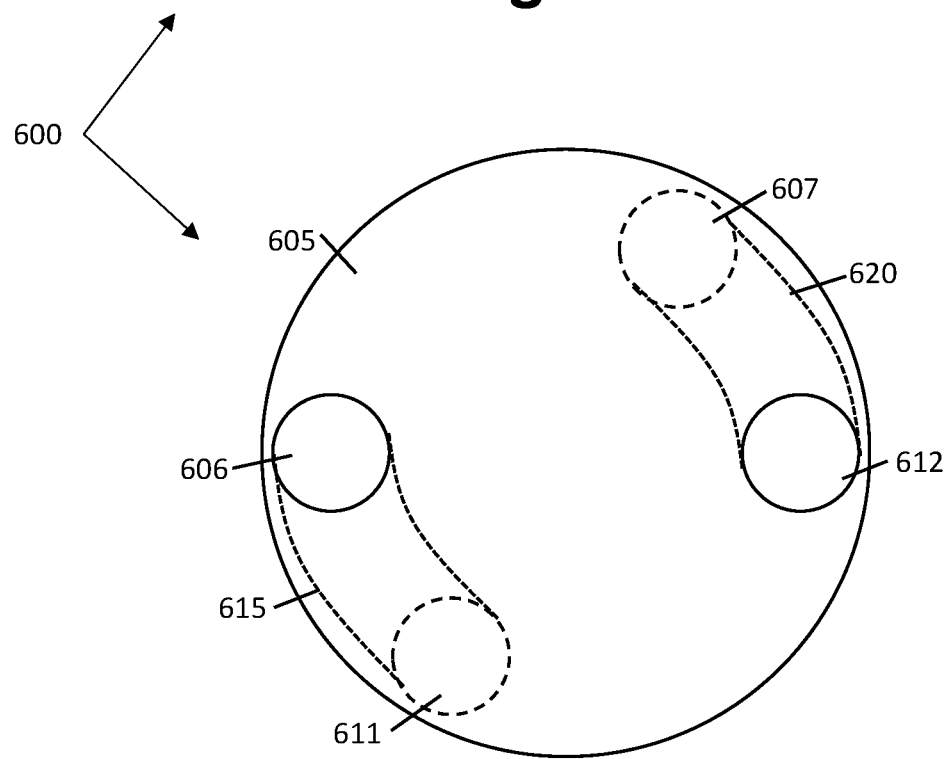
FIG. 6B is a schematic diagram of another view of the structure of FIG. 6A.

FIGS. 6A and 6B show different illustrative views of an alternative structure 600 for an inlet according to an example. The structure 600 comprises a single element having an outer face 605 and an inner face 610. The outer face 605 incorporates apertures, 606 and 607, which act as air inlets. The inner face 610 incorporates corresponding apertures, 611 and 612, which act as air outlets and are connected through the structure, via respective air channels 615 and 620, to the apertures on the outer face. The apertures 611, 612 on the inner face 610 are in effect rotationally offset with respect to the apertures 606, 607 on the outer face. Accordingly, a forced air flow drawn into the structure from the outer face is disrupted as it enters a respective container, due to the airflow being guided in multiple different directions. Such a structure may instead be designed with a single aperture through a single element or with more than two apertures through the single element. The apertures may be arranged in various different ways to increase air flow disruption.

Figure 7:
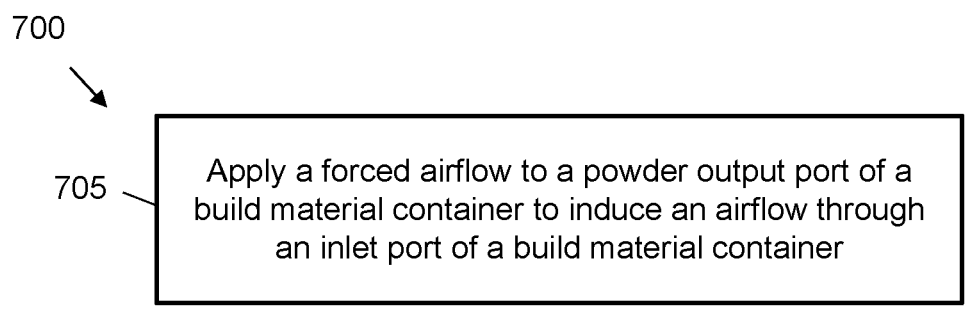
FIG. 7 is a flowchart showing a method of inducing an airflow through an inlet port of a build material container according to an example.

FIG. 7 shows an example of a method 700 of inducing an air flow in a 3D additive manufacturing system. The method 700 comprises a block 705 wherein a build material is aspirated from an output port of a container thereby inducing a forced airflow through an inlet port of a container. The inlet port comprises a structure to disrupt a forced airflow entering the container in use. In certain examples, the method 700 is enacted in a 3D additive manufacturing system wherein the inlet port includes a structure comprising an aperture having an inlet face and an outlet face. In certain examples, the inlet face and outlet face are non-aligned to disrupt an airflow passing through the inlet structure on entering into the inlet port. Certain examples described herein provide a container in which to enact the method 700.

FIG. 8A is a schematic diagram illustrating an exemplary path of an undisrupted forced air flow entering a build material container 800. The air flow is caused to enter the container 800 through inlet 810, as build powder is extracted through outlet 820, and flows to the outlet 820. The air flow is undisrupted in so far as an inlet 810 to the build material container 800 has no significant influence on the air flow form and/or direction. The air flow only disturbs the build powder 830 located between the inlet 810 and the outlet 820. Build powder 830 located against the container walls 840, 850 remains in the container 800. Build powder 830 may be stranded after the air flow has passed through the container 800.

FIG. 8B shows a schematic diagram illustrating an exemplary path of a disrupted air flow entering a build material container 850. The air flow enters the container 850 through inlet 860 and is disrupted by a structure 865 of the kind that is described herein. The air flow is disrupted in so far as an inlet 810 to the build material container 800 has a significant influence on the air flow form and/or direction. The air flow may be turbulent, cyclonic and may form a vortex. The disrupted air flow flows around the container 850 to the outlet 870. The disrupted air flow may dislocate build powder 880 located in the container 800 and positioned against the walls 890, 895. The disrupted air flow in FIG. 8B encourages powder 880 away from the walls 890, 895 so that the powder 880 is removed through the outlet 870. The dislocated powder 880 may then be easily extracted and, as such, the loading of the 3D printer or a PMS is optimized. Build powder 830 is not stranded after the air flow has passed through the container 800.

The preceding description has been presented to illustrate and describe examples of the principles described. This description is not intended to be exhaustive or to limit these principles to any precise form disclosed. Many modifications and variations are possible in light of the above teaching. For instance, an inlet structure may comprise one, two three or more elements of the kind described herein, each comprising one or more apertures. It is to be understood that any feature described in relation to any one example may be used alone, or in combination with other features described, and may also be used in combination with any features of any other of the examples, or any combination of any other of the examples.

What is claimed is:

1. A build material container comprising:
   an outlet through an outer surface of the build material container to enable build material to be extracted from the build material container; and
   an inlet through the outer surface of the build material container to enable a forced airflow to enter into the build material container in use, the inlet having a longitudinal axis and comprising:
   a tubular structure comprising a first element having an inner face forming a first aperture, and a second element having an outer face forming a second aperture, the first aperture and the second aperture to pass the forced airflow and being non-aligned along at least one axis which passes through each of the inner face and the outer face and is parallel to the longitudinal axis, wherein the first element and second element are to disrupt the forced airflow entering into the build material container in use.

2. The build material container of claim 1, wherein the longitudinal axis of the inlet is perpendicular to the outer surface of the build material container.

3. The build material container of claim 1, wherein each of the inner face and the outer face is perpendicular to the longitudinal axis of the inlet.

4. The build material container of claim 1, wherein the outer surface comprises a plane through which the longitudinal axis of the inlet projects, wherein each of the inner face and the outer face is parallel to the plane of the outer surface.

5. The build material container of claim 1, wherein the first aperture is axially offset from the second aperture along an axis that is parallel to the longitudinal axis of the inlet.

6. The build material container of claim 1, wherein the first element has a first frame comprising a plurality of apertures in a first arrangement of apertures, and the second element has a second frame comprising a plurality of apertures in a second arrangement of apertures.

7. The build material container of claim 6, wherein the first arrangement of apertures is the same as the second arrangement of apertures.

8. The build material container of claim 6, wherein the first frame is rotated around the longitudinal axis of the inlet relative to the second frame, so that the plurality of apertures in the first frame are non-aligned with the plurality of apertures in the second frame.

9. The build material container of claim 6, wherein the first arrangement of apertures or the second arrangement of apertures comprises a hexagonal aperture.

10. The build material container of claim 6, wherein the first arrangement of apertures or the second arrangement of apertures comprises a trapezoidal aperture.

11. The build material container of claim 6, wherein the first frame comprises a plurality of elongate arms that define the plurality of apertures in the first arrangement of apertures.

12. The build material container of claim 1, wherein the first element and the second element are spaced apart longitudinally in the inlet.

13. The build material container of claim 1, further comprising an air filter between the first element and the second element.

14. The build material container of claim 1, wherein the inlet comprises an open end, and the second element is arranged to releasably cover the open end of the inlet.

15. The build material container of claim 1, wherein the tubular structure comprises a tube in which the first element and the second element are arranged.

16. The build material container of claim 1, wherein the inlet further comprises a tube, and the tubular structure is connected to the tube.

17. The build material container of claim 1, wherein the tubular structure comprises a tubular cover and a tube, the tubular cover comprising the second element, and the first element being arranged in the tube.

18. A build material container comprising:
a reservoir to contain a build material;
an outlet structure to allow the build material to be drawn from the reservoir; and
an inlet structure to permit air to flow into the reservoir, the inlet structure comprising a tubular structure, a first element having an inlet face forming a first aperture, and a second element having an outlet face forming a second aperture,
wherein the first element and the second element are arranged in the tubular structure, and wherein the inlet face and outlet face are arranged to create a rotational airflow passing through the inlet structure into the build material container.

19. A build material container comprising:
an outlet through an outer surface of the build material container to enable build material to be extracted from the build material container; and
an inlet through the outer surface of the build material container to enable a forced airflow to enter into the build material container in use, the inlet having a longitudinal axis and comprising:
a structure comprising a first element having an inner face, and a second element having an outer face, wherein the first element comprises a first aperture, and second element comprises a second aperture non-aligned with the first aperture along at least one axis which passes through each of the inner face and the outer face and is parallel to the longitudinal axis, to disrupt the forced airflow entering into the build material container in use,
wherein the first element has a first frame comprising a plurality of apertures in a first arrangement, and the second element has a second frame comprising a plurality of apertures in a second arrangement,
wherein the first frame comprises a plurality of elongate arms that define the plurality of apertures in the first arrangement, and wherein an elongate arm of the plurality of elongate arms has a longitudinal cross-section selected from among a parallelogrammical longitudinal cross-section, a trapezoidal longitudinal cross-section, and a hexagonal longitudinal cross-section.

20. The build material container of claim 11, wherein an elongate arm of the plurality of elongate arms has a trapezoidal longitudinal cross-section.

21. The build material container of claim 11, wherein an elongate arm of the plurality of elongate arms has a hexagonal longitudinal cross-section.

\* \* \* \* \*